US011409302B2

(12) United States Patent
Sarkar et al.

(10) Patent No.: US 11,409,302 B2
(45) Date of Patent: Aug. 9, 2022

(54) METHOD FOR AUTONOMOUS PARKING OF A VEHICLE, AND AN AUTONOMOUS VEHICLE THEREOF

(71) Applicant: Wipro Limited, Bangalore (IN)

(72) Inventors: Manas Sarkar, Barasat (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 150 days.

(21) Appl. No.: 16/354,908

(22) Filed: Mar. 15, 2019

(65) Prior Publication Data

US 2020/0278688 A1 Sep. 3, 2020

(30) Foreign Application Priority Data

Mar. 4, 2019 (IN) .............................. 201941008321

(51) Int. Cl.
*G05D 1/02* (2020.01)
*G06F 16/29* (2019.01)
(Continued)

(52) U.S. Cl.
CPC ....... *G05D 1/0238* (2013.01); *G01C 21/3685* (2013.01); *G01S 7/4802* (2013.01);
(Continued)

(58) Field of Classification Search
CPC ........... G05D 1/00; G05D 1/02; G05D 1/021; G05D 1/0212; G05D 1/0231; G05D 1/0238; G05D 2201/00; G05D 2201/02; G05D 2201/0213; G06F 16/00; G06F 16/20; G06F 16/29; G01S 17/00; G01S 17/88; G01S 17/93; G01S 17/931; G01S 7/00; G01S 7/02; G01S 7/42; G01S 7/48; G01S 7/4802; G01C 21/00; G01C 21/26; G01C 21/34; G01C 21/36; G01C 21/3667;
(Continued)

(56) References Cited

U.S. PATENT DOCUMENTS

2015/0142267 A1\* 5/2015 Lee ...................... G01C 21/20
701/41
2016/0180177 A1\* 6/2016 Nguyen ............. G06K 9/00798
382/104

(Continued)

*Primary Examiner* — Geepy Pe
*Assistant Examiner* — Michael Allen Brace, Jr.
(74) *Attorney, Agent, or Firm* — Finnegan, Henderson, Farabow, Garrett & Dunner, LLP

(57) ABSTRACT

The present disclosure relates to a methods and systems for autonomous parking of vehicles (103). The vehicle receives an input signal for parking the vehicle in parking premises (100) comprising a plurality of parking space (102) having an elevated parking boundary indicator (101). The vehicle (103) obtains a map of the parking premises (100). Further, the vehicle (103) receives a plurality of LIDAR data points (205) of the parking premises (100) and identifies a plurality of linear patterns from the plurality of LIDAR data points (205). Thereafter, the vehicle (103) detects at least two linear patterns (401) from the plurality of linear patterns, having a predefined length and parallelly spaced apart, indicating the elevated parking boundary indicator (101) of an available parking space, where the vehicle (103) can be autonomously parked in the available parking space.

7 Claims, 17 Drawing Sheets

(51) Int. Cl.
*G01S 17/931* (2020.01)
*G01C 21/36* (2006.01)
*G01S 7/48* (2006.01)
*G01S 17/42* (2006.01)
*G08G 1/14* (2006.01)

(52) U.S. Cl.
CPC ............ *G01S 17/42* (2013.01); *G01S 17/931* (2020.01); *G05D 1/0212* (2013.01); *G06F 16/29* (2019.01); *G08G 1/143* (2013.01); *G05D 2201/0213* (2013.01)

(58) Field of Classification Search
CPC .. G01C 21/3679; G01C 21/3685; G08G 1/00; G08G 1/14; G08G 1/141; G08G 1/143
See application file for complete search history.

(56) References Cited

U.S. PATENT DOCUMENTS

| | | | |
|---|---|---|---|
| 2016/0280263 A1* | 9/2016 | Mori | B62D 15/0285 |
| 2017/0168146 A1 | 6/2017 | Boehmke | |
| 2018/0072311 A1* | 3/2018 | Sham | G01C 21/3685 |
| 2018/0086381 A1* | 3/2018 | Hoffman, Jr. | B62D 15/0285 |
| 2018/0120851 A1* | 5/2018 | Shin | G01S 17/931 |
| 2018/0203113 A1* | 7/2018 | Taylor | G06K 9/00791 |
| 2018/0339701 A1* | 11/2018 | Kwon | B60W 30/06 |
| 2019/0016331 A1* | 1/2019 | Carlson | B60W 30/06 |
| 2019/0324148 A1* | 10/2019 | Kim | G01S 17/89 |
| 2020/0114904 A1* | 4/2020 | Lee | G01S 13/931 |
| 2020/0143682 A1* | 5/2020 | Chow | G08G 1/143 |

\* cited by examiner

METHOD FOR AUTONOMOUS PARKING OF A VEHICLE, AND AN AUTONOMOUS VEHICLE THEREOF

TECHNICAL FIELD

The present disclosure relates to Autonomous Vehicles (AV). More particularly, the present disclosure relates to autonomous parking of an autonomous vehicles.

BACKGROUND

Currently, autonomous parking is performed by many vehicles. Existing technology uses cameras, ultrasound sensors-based assistance for autonomous parking. Currently, a computer-implemented system exists for determining a preferred parking space for an autonomous or semi-autonomous vehicle. Cameras pose a limitation of image clarity especially in the night. Therefore, the parking space and parking boundaries cannot be accurately determined. Further, 3-D point cloud data collected using Light Detection and Ranging (LIDAR) is pre-processed and then the minimum size of parking space is calculated according to the dynamic theories of vehicle. Secondly, the rapidly-exploring Random Tree (RRT) algorithm is improved in two aspects based on moving characteristics of autonomous vehicle and calculates the parking space on the basis of the vehicle's dynamics and collision constraints. Besides, fuzzy logic controller is used to control the brake and accelerator to realize the stability of speed. However, conventional approaches are deficient of a comprehensive system or method that utilizes the functionality of autonomous vehicles to assist in vehicle parking. Therefore, there is need for systems and methods to assist drivers in parking vehicles.

The information disclosed in this background of the disclosure section is only for enhancement of understanding of the general background of the invention and should not be taken as an acknowledgement or any form of suggestion that this information forms the prior art already known to a person skilled in the art.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In an embodiment, a method and a system are disclosed for autonomously parking vehicle. The autonomous parking may be enabled by computing Light Detection and Ranging (LIDAR) data points obtained from a LIDAR unit mounted on the vehicle to collect reflections of a plurality of light rays. The parking procedures may be initiated when an ECU of the vehicle receives a signal for parking the vehicle in parking premises. The parking premises may comprise a plurality of parking spaces. Each parking space may have an elevated parking boundary indicator. Further, the ECU may obtain a map of the parking premises for navigating the vehicle along the parking premises. Furthermore, the ECU may receive the plurality of LIDAR data points from the LIDAR unit. Thereafter, the ECU may identify a plurality of linear patterns from the plurality of LIDAR data points. The linear patterns may be identified by matching the plurality of LIDAR data points with a straight-line equation. The plurality of linear patterns may correspond to the elevated parking boundary indicator of the plurality of parking spaces. Further, the ECU may detect at least two linear patterns from the plurality of linear patterns having a predefined length and parallelly spaced apart. The predefined length and parallel space may be based on dimensions of the vehicle. Lastly, the vehicle is autonomously parked in the detected parking space.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
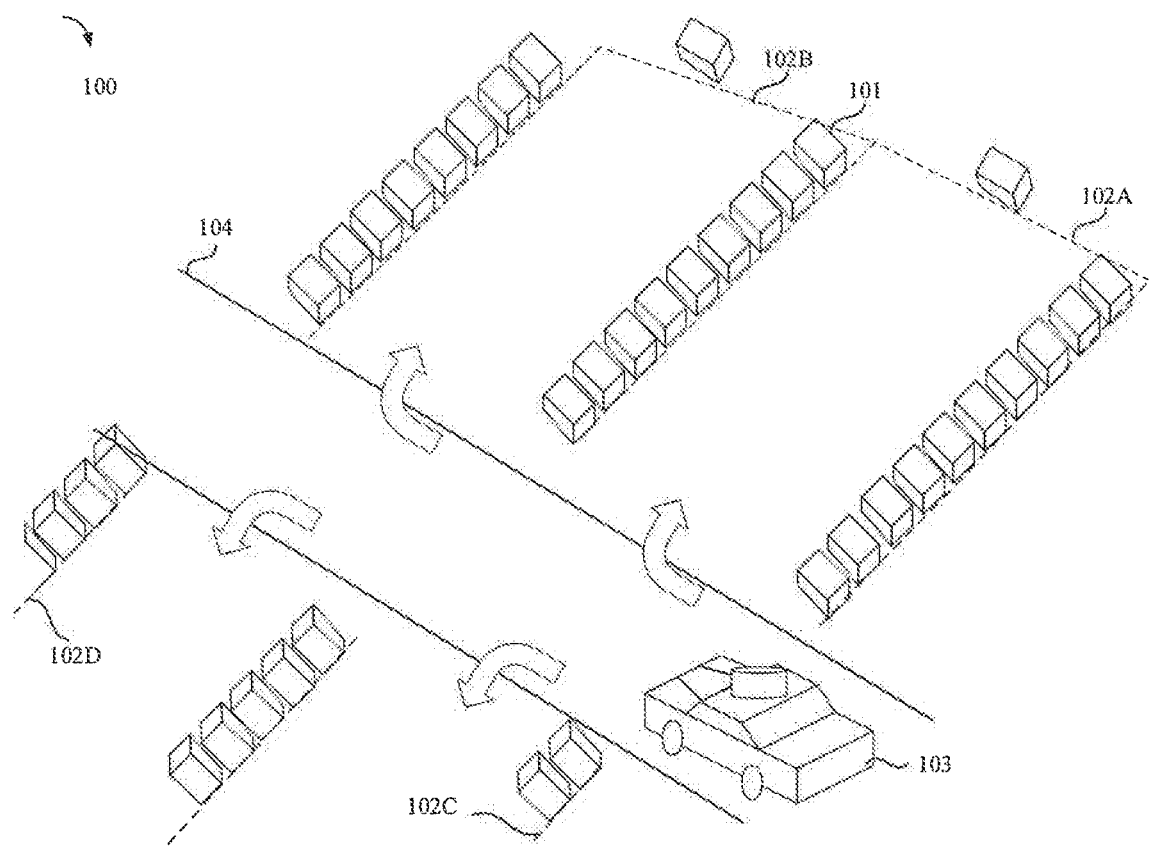
FIG. 1 illustrates a simplified diagram of parking premises for Automatic Vehicles (AV), in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "includes", "comprising", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or apparatus.

Embodiments of the present disclosure relate to methods and systems for autonomous parking of vehicles. In an embodiment, the methods are proposed for autonomous vehicles. In an embodiment, an Autonomous Vehicle (AV) uses Light Detection and Ranging (LIDAR) data points to determine an available (potential) parking space in parking premises.

FIG. 1 illustrates parking premises (100). In an embodiment, the parking premises (100) may be dedicated only for AVs (103). In another embodiment, the parking premises (100) may be enabled for semi-autonomous vehicles. In an embodiment, the parking premises (100) may comprise a plurality of parking spaces (102A, 102B, 102C, 102D . . . 102N). The parking space may be generally denoted by referral numeral (102) in the present disclosure. As shown in FIG. 1, each parking space (102) may have an elevated parking boundary indicator (101). Typically, the elevated parking boundary indicator (101) may have an elevation of at least 10 cm from the ground surface. The elevation of the elevated parking boundary indicator (101) may also vary depending on the parking premises (100). For example, an outdoor parking premises (100) may have elevated parking boundary indicator (101) with elevation of about 10 cm. An industry may have elevated parking boundary indicator (101) with an elevation of about 15-20 cm. In one embodiment, the elevation of the elevated parking boundary indicator (101) may also depend on the type of vehicles. For example, the elevation of the elevated parking boundary indicator (101) may be about 10 cm for cars and the elevation of the elevated parking boundary indicator (101) may be about 15-20 cm for trucks. The parking premises (100) may have dedicated paths (roads) (104). The AV (103) is configured to determine an available parking space (102) from the plurality of parking spaces (102A, 102B . . . 102N). In one embodiment, the vehicle can be semi-autonomous. In one embodiment, the elevated parking boundary indicator (101) may have different shapes. For example, the elevated parking boundary indicator (101) may take shapes including but not limited to a rectangular block, a square block and the like. In one embodiment, the elevated parking boundary indicator (101) may be continuous throughout the boundary or may be discontinuous along the boundary.

Figure 2:
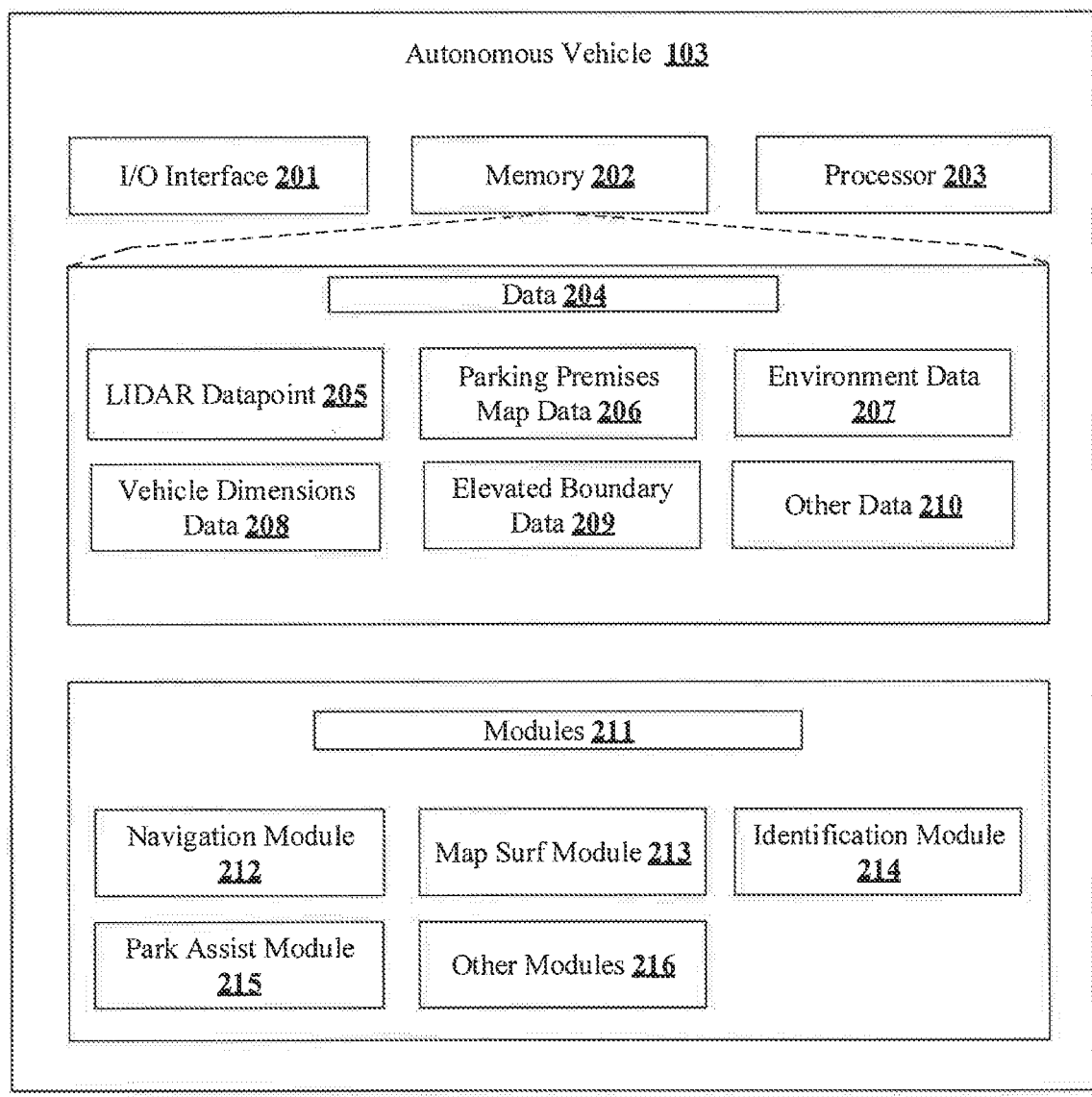
FIG. 2 shows an exemplary block diagram of internal elements of an Autonomous Vehicle (AV), in accordance with an embodiment of the present disclosure.

FIG. 2 illustrates internal architecture of the AV (103) in accordance with some embodiments of the present disclosure. The AV (103) may include at least one Electronic Control Unit (ECU) ("CPU" or "processor") (203) and a memory (202) storing instructions executable by the ECU (203). The ECU (203) may comprise at least one data processor for executing program components for executing user or system-generated requests. The memory (202) is communicatively coupled to the ECU (203). The AV (103) further comprises an Input/Output (I/O) interface (201). The I/O interface (201) is coupled with the ECU (203) through which an input signal or/and an output signal is communicated.

In an embodiment, data 204 may be stored within the memory 202. The data 204 may include, for example, LIDAR data points (205), parking premises map data (206), environment data (207), vehicle dimensions data (208), elevated boundary data (209) and other data (210).

In an embodiment, the LIDAR data points (205) may comprise 3-D data about the AV (103) surroundings. The LIDAR data points (205) may be received from a LIDAR unit (not shown in FIG. 2) mounted on the AV (103). The LIDAR unit may shoot a plurality of light rays and receive reflected rays reflected off from objects in the AV (103) surroundings. A map is generated by the LIDAR unit using the reflected rays. The map comprises the plurality of LIDAR data points (205) indicating the elevations of plurality of objects in the AV (103) surroundings.

In an embodiment, the parking premises map data (206) may comprise a map of the parking premises (100). In one embodiment, the map may be obtained from a server associated with the parking premises (100). In another embodiment, the AV (103) may be loaded with the map of the parking premises (100). The map may comprise the locations of the plurality of parking spaces (102A . . . 102N) in the parking premises (100), roads (104) in the parking premises, a boundary (not shown) of the parking premises (100).

In an embodiment, the environment data (207) may comprises data related to the AV (103) surroundings. In one embodiment, the environment data may be received from various environment sensors of the AV (103). Examples of the environment sensors may include but are not limited to, a rain sensor, luminosity sensor, temperature sensor, pressure sensor and the like. The environment data (207) may be used while navigating the AV (103) and parking the AV (103).

In an embodiment, the vehicle dimensions data (208) may include dimensions of the AV (103). The dimensions may include, length of the AV (103), width of the AV (103), ground clearance of the AV (103), mass of the AV (103), and the like.

In an embodiment, the elevated boundary data (209) may include a range of elevations of the elevated parking boundary indicators (101), and shapes of the elevated parking boundary indicators (101). In an example embodiment the range of elevations of the elevated parking boundary indicators (101) can be 10 cm for cars, 15-20 cm for trucks. This data can be retrieved based on the vehicle type.

In an embodiment, the other data (210) may include but is not limited to information related to obstacles while parking the AV (103), parking premises server information, etc. For example, the parking premises server information can include server name, connectivity type, server ID and the like. In one instance, the AV (103) may be paired to a particular parking premises server. When the AV (103) arrives at the parking premises (100) having the paired parking premises server, the AV (103) may be connected to the server without following steps for pairing. In an embodiment, the parking premises server may bill the AV (103) for utilizing the parking premises (100). In an embodiment, the AV (103) may be equipped with services to pay the parking premises server for parking in the parking premises (100). In an embodiment, for a semi-autonomous vehicle (103), the parking premises server may provide a visual representation of the map to the passenger/driver seated in the semi-autonomous vehicle (103). In a further embodiment, the parking premises server may present options to the driver/passenger of the semi-autonomous vehicle (103) to make a payment for parking in the parking premises (100).

In an embodiment, the data 204 in the memory 202 is processed by modules 211 of the AV (103). As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 211 when configured with the functionality defined in the present disclosure will result in a novel hardware.

In one implementation, the modules 211 may include, for example, a navigation module (212), a map surf module (213), an identification module (214), a park assist module (215) and other modules 216. It will be appreciated that such aforementioned modules 211 may be represented as a single module or a combination of different modules. In an embodiment, each module 211 may be a part of the ECU (203) or each module (211) can be an individual circuit or individual computing unit (203).

In an embodiment, the navigation module (212) is configured to navigate the AV (103) from a source location to a destination location. In an embodiment, a user may have provided the source location and the destination to the AV (103). In one instance, the navigation module (212) may determine if the destination location is associated with parking premises (100). For example, if the destination location is a tourist spot, the navigation module (212) may be capable of determining if parking premises (100) is associated with the tourist spot and navigate the AV (103) to the parking premises (100). In a further embodiment, the navigation module (212) may generate a realistic velocity based on previous moment velocity and a projected velocity based on a trajectory plan determined for navigating the AV (103) from the source location to the destination location. Further, the navigation module (212) may monitor upcoming moment velocity for generating further realistic velocity.

In an embodiment, the map surf module (213) may be configured to surf for the parking premises map data (206). In one embodiment, the map surf module (213) may retrieve the parking premises data (206) from the memory (202). In another embodiment, if the parking premises map data (206) is unavailable with the AV (103), the map surf module (213) may request the parking premises server to provide the map. In an embodiment, the map surf module (213) may detect a parking premise (100) nearby and request the parking premise server to provide the map.

In an embodiment, the identification module (214) may be configured to identify an available parking space from a plurality of parking spaces (102A, 102B . . . 102N) in the parking premises (100) using the LIDAR data points (205).

In an embodiment, the park assist module (215) may be configured to assist the AV (103) in parking in the identified available parking space.

In an embodiment, the other module (216) may include but is not limited to a display module, a communication module and a stop detection module. The display module may be configured in a semi-autonomous vehicle to display the parking premises (100) and parking spaces (102A, 102B . . . 102N) to the driver/passenger. The communication module may be configured to communicate with the parking premises server. In another embodiment, the communication module may be capable of communicating with other vehicle using vehicle to vehicle (v2v) communication or vehicle to enterprise (v2x) communication. In an embodiment, the stop detection module may be configured to detect an obstacle around the AV (103) during parking the AV (103).

Figure 3:
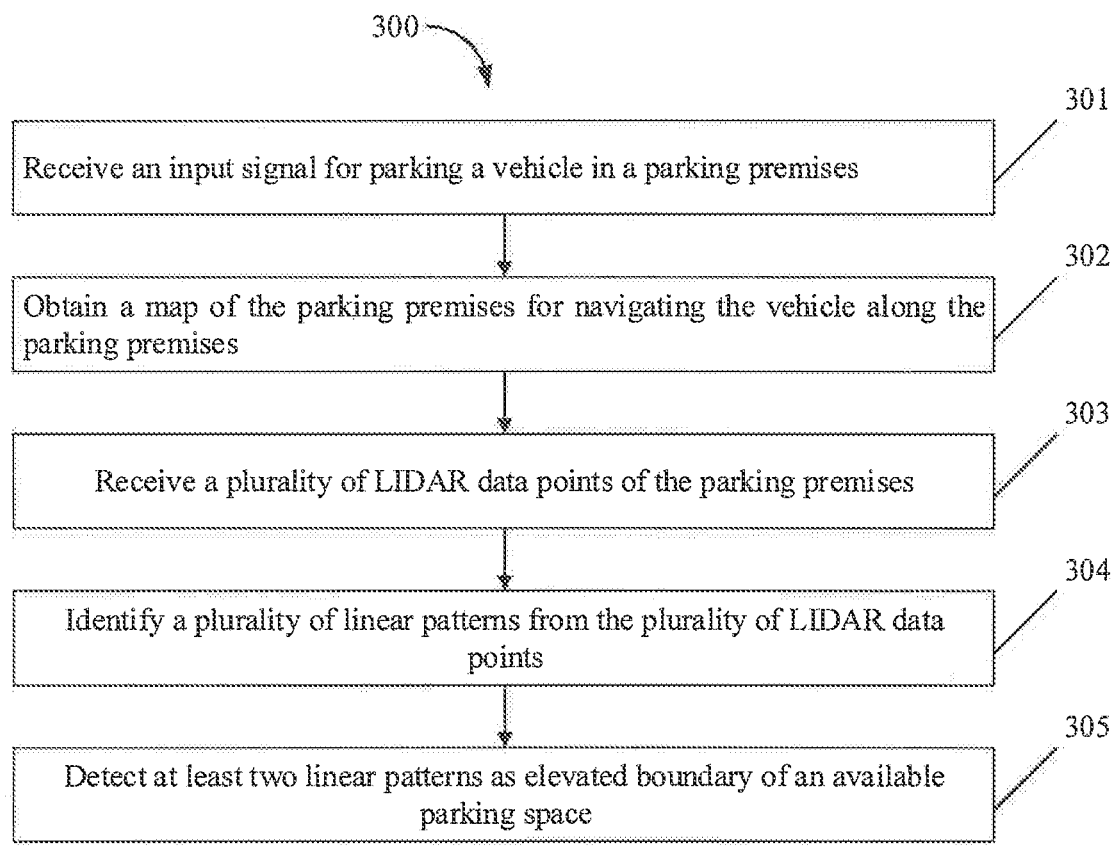
FIG. 3 shows an exemplary flow chart for autonomous parking, in accordance with an embodiment of the present disclosure.

FIG. 3 shows a flow chart illustrating a method for autonomously parking a vehicle, in accordance with some embodiments of the present disclosure.

As illustrated in FIG. 3, the method 300 may include one or more steps for autonomously parking a vehicle, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 301, the I/O interface (201) may receive an input signal for parking the AV (103) in the parking premises (100). In one instance, the navigation module (212) may detect parking premises (100) near the destination location and the I/O interface (201) may receive the signal from the navigation module (212) for parking the AV (103). As shown in FIG. 1, the parking premises (100) may comprise a plurality of parking spaces (102A . . . 102N). Each parking space (102) may have the elevated parking boundary indicator (101).

At step 302, the map surf module (213) may be configured to obtain the parking premises map data (206) either from the parking premises server or from the memory (202). The map surf module (213) may be further configured to share the parking premises map data (206) with the navigation module (212) for navigating the AV (103) along the parking premises (100).

At step 303, the identification module (214) may be configured to receive the plurality of LIDAR data points (205) from the LIDAR unit. In an embodiment, the LIDAR unit may be configured to obtain the plurality of LIDAR data points (205) of the parking premises (100) as the AV (103) is navigated along the parking premises (100).

Figure 4A:
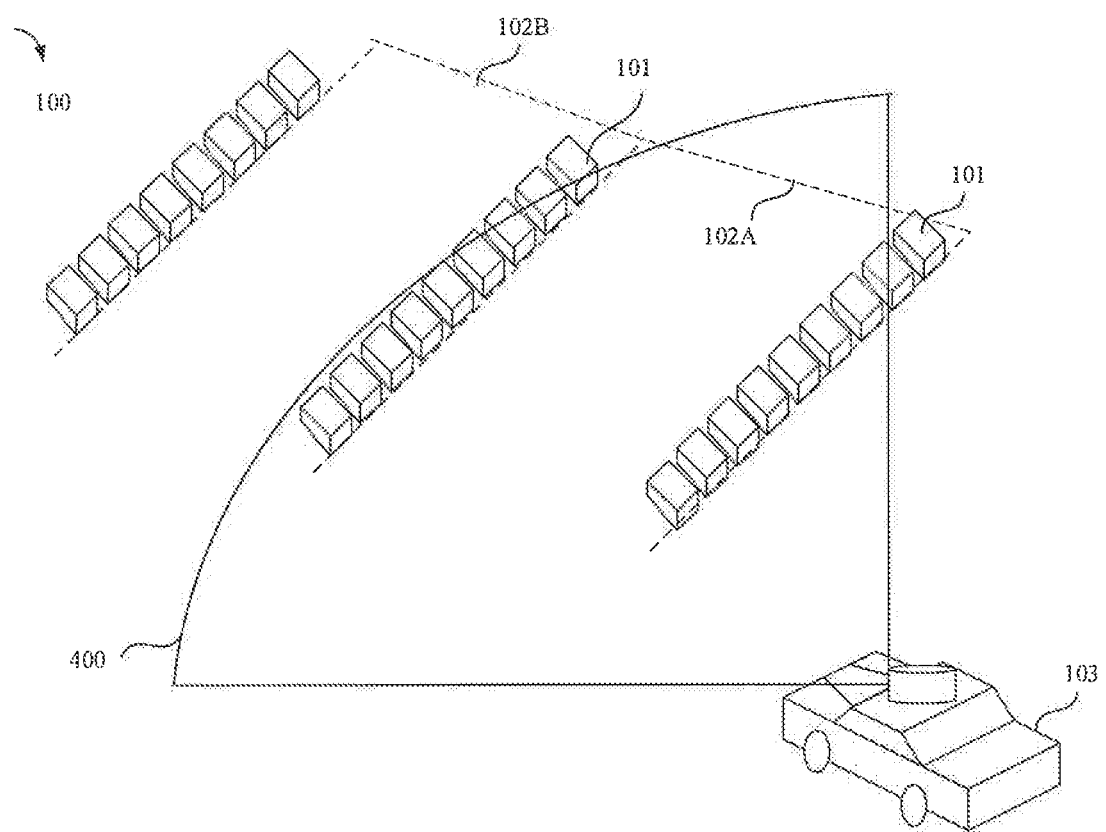
FIG. 4A-4L illustrates LIDAR data points reflection from elevated parking boundary indicator in different scenarios in the parking premises, in accordance with an embodiment of the present disclosure.

At step 304, the identification module (214) may be further configured to identify a plurality of linear patterns using the plurality of LIDAR data points (205). Reference is now made to FIG. 4A illustrating a first instance of collecting LIDAR data points (205) in an empty parking premises (100). As seen in the FIG. 4A, the parking premises (100) comprises two empty parking spaces (102A and 102B). The parking space (102A) has the elevated parking boundary indicators (101A and 101B). Likewise, the parking space (102B) has the elevated parking boundary indicators (101B and 101C). As shown in the FIG. 4A, the elevated parking boundary indicators (101) are rectangular blocks. A person skilled in the art should appreciate that the elevated parking boundary indicators (101) may take other relevant shape and design. As shown in the FIG. 4A, the LIDAR unit scans the parking premises (100) having two empty parking spaces (102A and 102B).

Figure 4B:
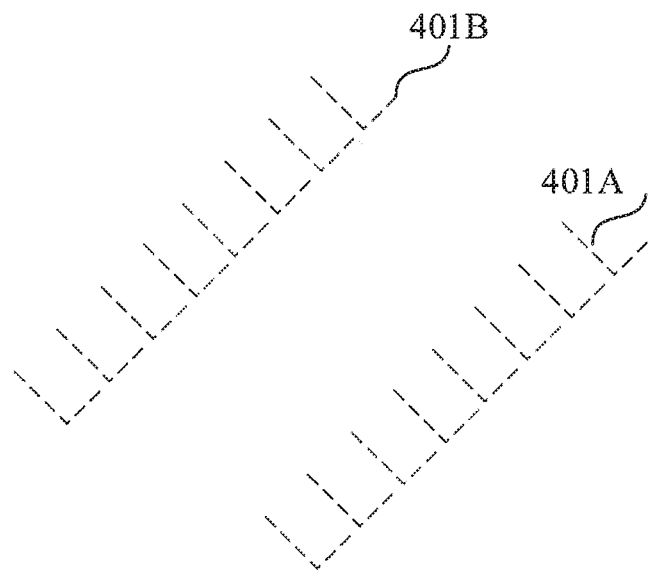

FIG. 4B shows the scan lines (data points) of the parking space (102A). As seen in FIG. 4B, some of the LIDAR data points (205) comprises two sets of "L" shaped lines (401A and 401B). The LIDAR data points (401A) correspond to the elevated parking boundary indicator (101A) and the LIDAR data points (401B) correspond to the elevated parking boundary indicator (101B). Further, as seen, the LIDAR data points (401A and 401B) are formed in "L" shape due to natural reflection of LIDAR ray beams from the elevated parking boundary indicator (101) (brick like structures). In an embodiment, the identification module (214) may identify a plurality of patterns (401A, 401B ... 401N). A person skilled in the art will appreciate that the plurality of patterns will be generated by falling of LIDAR rays on specific brick structure. For specific illustration purpose, FIG. 4B discloses only two patterns. This depends on the viewing range of the Lidar. This should not be construed as a limitation.

Figure 4C:
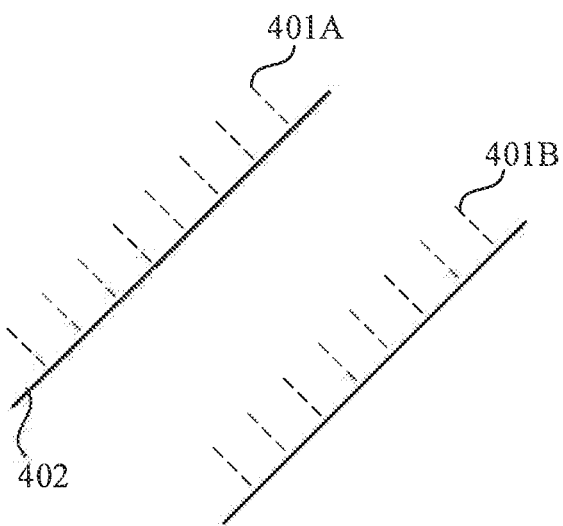

The identification module (214) further identifies patterns of LIDAR reflection points having straight line arrangement. The identification module (214) may compare each identified pattern with a straight-line equation. If a pattern satisfies the straight-line equation, that pattern is considered as a linear pattern. FIG. 4C illustrates determining linear patters using straight-line arrangement. As shown in FIG. 4C, the straight line (402) is used to check if the patterns (401A and 401B) are linear patterns. As seen in the FIG. 4C, the patterns (401A and 401B) satisfies the straight-line arrangement. Hence, the patterns (401A and 401B) are considered as linear patterns.

Figure 4D:
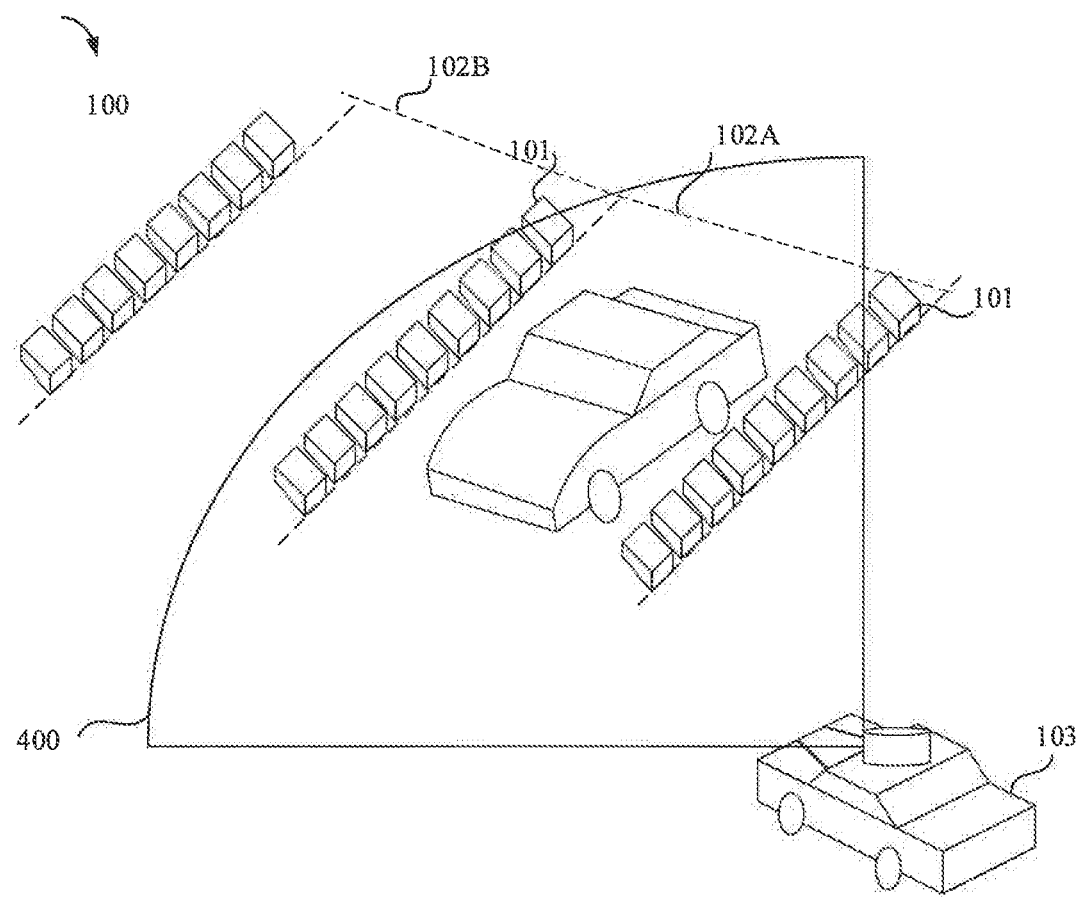
Figure 4E:
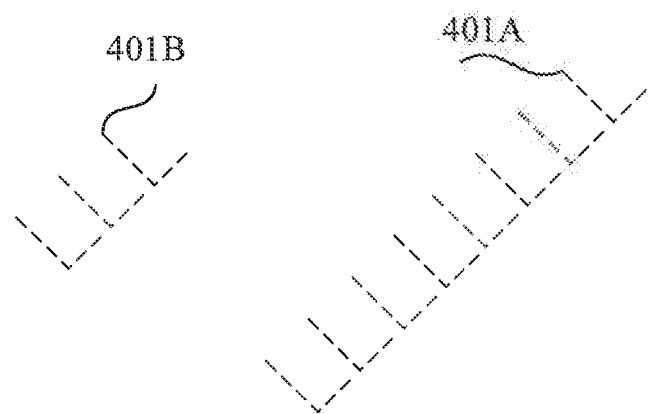
Figure 4F:
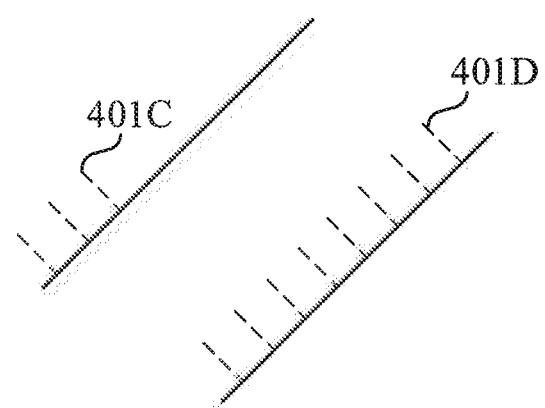

FIG. 4D, illustrates a second instance of collecting LIDAR data points (205) in an occupied parking space (102A). FIG. 4E illustrates LIDAR data points corresponding to the elevated parking boundary indicators (101A and 101B) respectively. FIG. 4F illustrates determining linearity of LIDAR data points in the second instance. As seen in FIG. 4D, a vehicle is parked in the parking space (102A). The LIDAR data points collected by the AV (103) is as shown in FIG. 4E. In presence of the vehicle in the parking space (102A), the LIDAR data points corresponding to the elevated parking boundary (101A) is denoted by the pattern (401A). Further, the LIDAR data points corresponding to the elevated parking boundary (101B) is denoted by the pattern (401B). As seen, the pattern (401B) may look incomplete due to the presence of the vehicle in the parking space (102A). Further, as shown in FIG. 4F, the pattern is compared with the straight-line arrangement to determine linearity of the patterns.

At step 305, the identification module (214) may be configured to detect at least two patterns (401A and 401B) from the plurality of patterns. The linear patterns (401A and 401B) as shown in FIG. 4C and FIG. 4F are compared with predefined length and a predefined width. The predefined length may be the length of the AV (103) and the predefined width may be the width of the AV (103). In one embodiment, if the at least two patterns (401A and 401B) have a length equal or greater than the predefined length and a parallel space between the at least two patterns (401A and 401B) is equal or greater than the predefined width, the parking space (102A) having the elevated parking boundary indicator (101A) to which the least two patterns (401A and 401B) correspond, may be considered as an available parking space.

Figure 4G:
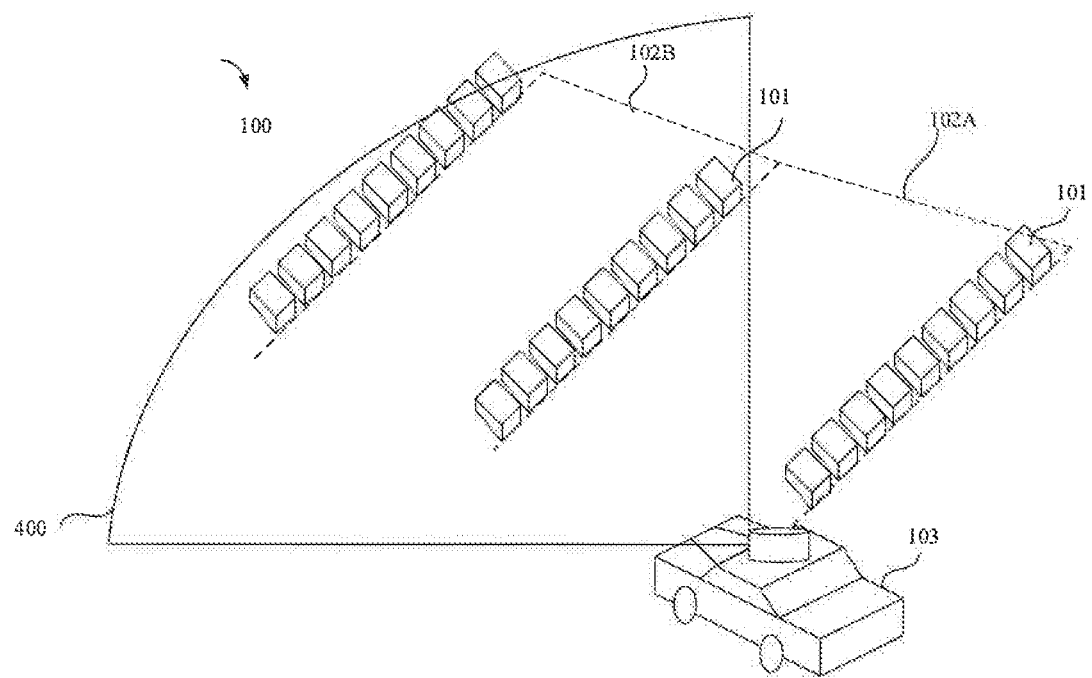
Figure 4H:
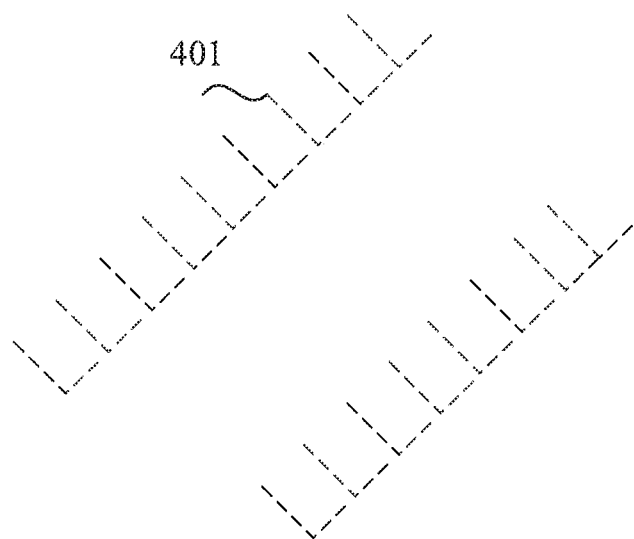
Figure 4I:
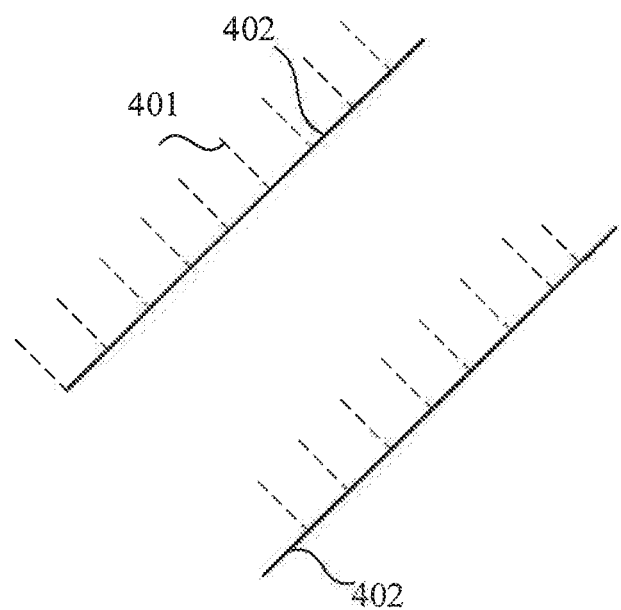

In an embodiment, FIG. 4G illustrates a scenario where the AV (103) scans the parking space (102B) adjacent to an empty parking space (102A). FIGS. 4H and 4I illustrates LIDAR data points (205) obtained for this scenario and straight-line arrangement of the LIDAR data points (205). As the elevated parking boundary indicators (101) are complete, the parking space (101B) is considered as an available parking space.

Figure 4J:
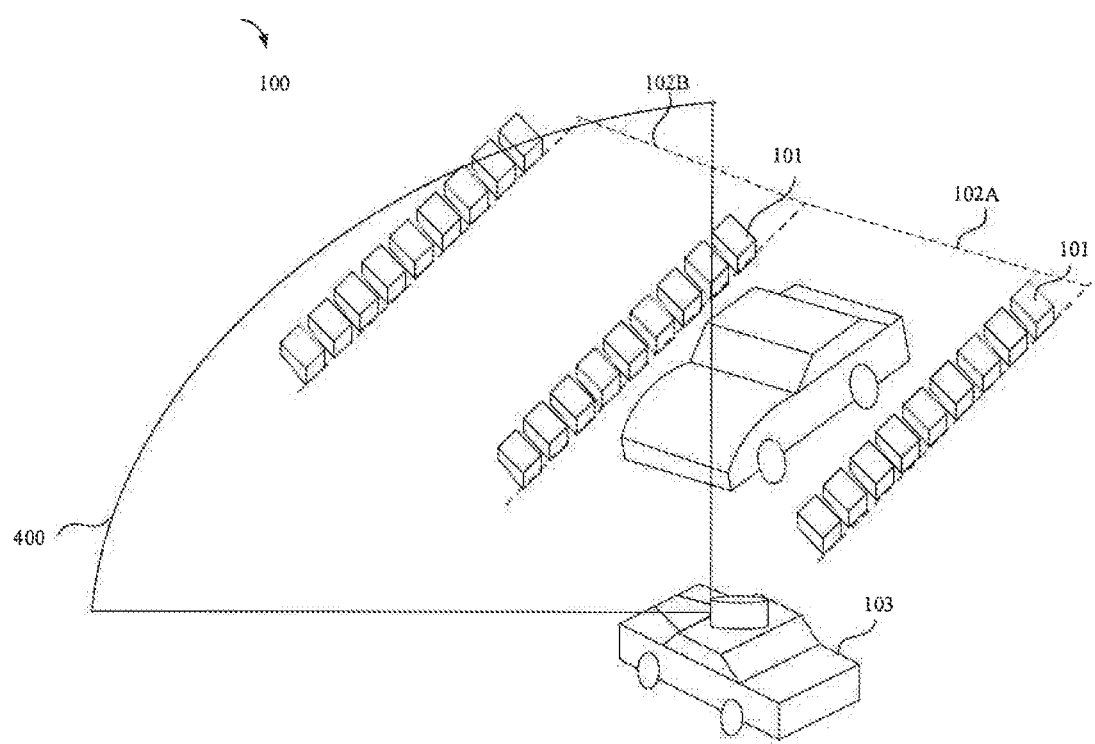
Figure 4K:
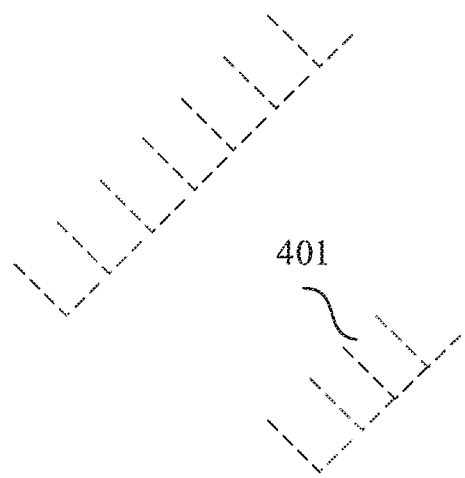
Figure 4L:
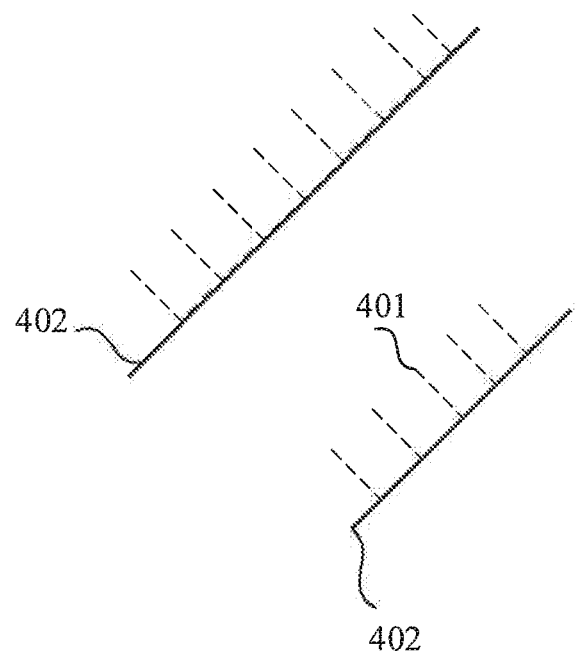

FIG. 4J illustrates a scenario where the AV (103) scans the parking space (102B) adjacent to an occupied parking space (102A). FIGS. 4K and 4L illustrates LIDAR data points (205) obtained for this scenario and straight-line arrangement of the LIDAR data points (205). As seen the elevated parking boundary indicator (101) of the parking space (101A) looks incomplete whereas the elevated parking boundary indicator (101) of the parking space (101B) looks complete. Although, the elevated parking boundary indicator (101) of the parking space (101A) looks incomplete, as the farther elevated parking boundary indicator (elevated parking boundary indicator (101) of the parking space (101A)) is considered to determine the available parking space. Hence, the parking space (101B) is considered as an available parking space in this scenario as well.

In an embodiment, the identification module (214) may search for the linear patterns in a plurality of directions from the LIDAR data points (205). In one embodiment, the identification module (214) may begin the search in a predefined direction. The identification module (214) may note the results in the predefined direction and rotate the direction by at least 2 degrees in a predefined direction for searching in the rotated direction. The search may be performed in a front direction as the AV (103) is moving forward. The front direction further can be divided into two part, left and right for possible availability of empty parking space. Let us consider that right side lidar points are processed first as first preference, then left side lidar points are processed if no empty space is available on right. If no space is available, the AV (103) is moved further ahead and continues the LIDAR scan processing. The quarter circle boundary (400) in FIG. 4A represents one side scanning and processing boundary based on LIDAR viewing range. In an embodiment, the identification module (214) may further determine an orientation of the available parking space. If the search is performed in N directions, and if M searches are performed in each direction, then total search performed may be M*N.

Figure 5A:
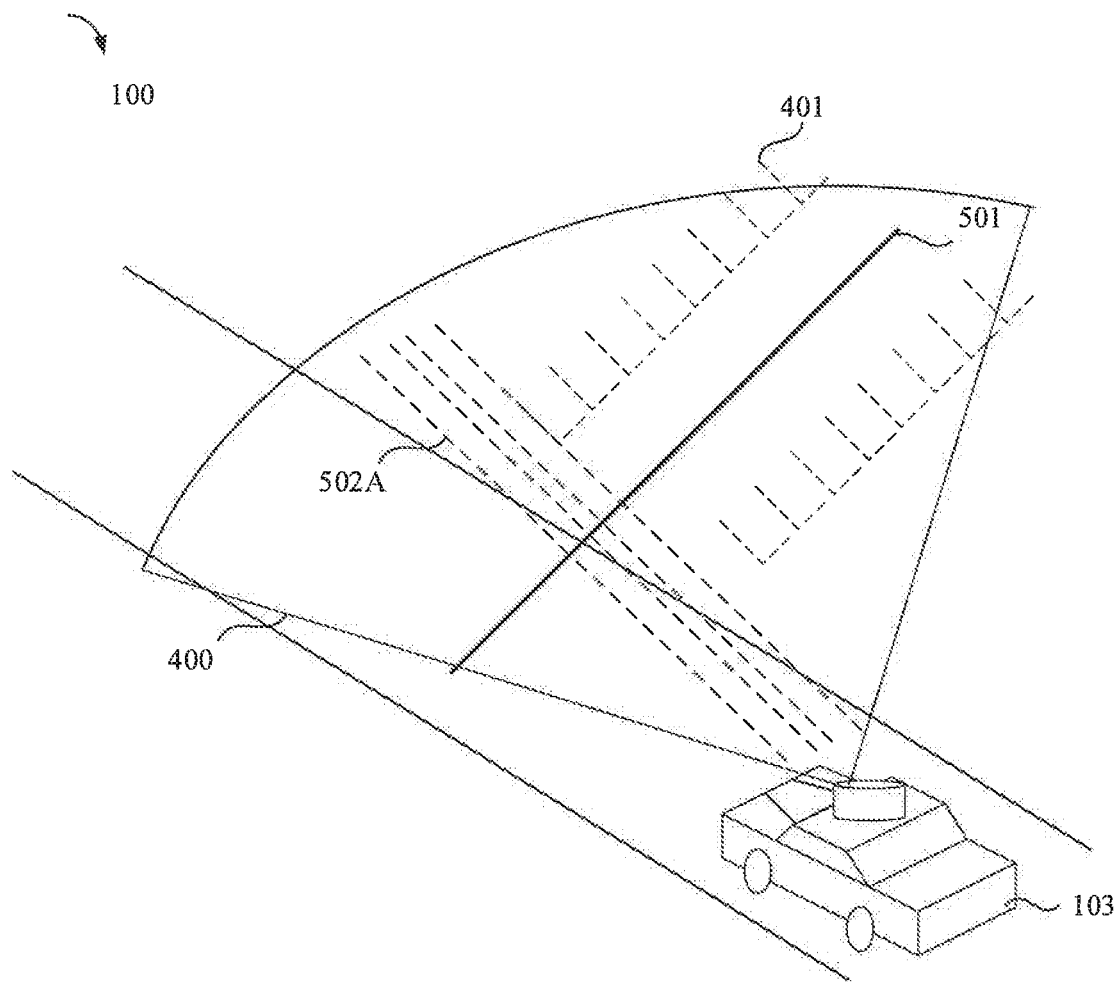
FIG. 5A-5C illustrates determining orientation of a n available parking space, in accordance with an embodiment of the present disclosure.

In an embodiment, upon detecting the at least two linear patterns (401A and 401B), the identification module (214) may be configured to determine orientation of the at least two linear patterns (401A and 401B). FIG. 5A illustrates a scenario of detecting orientation of the available parking space. As seen in FIG. 5A, search lines (502) are generated. The search lines (502A) are compared with a longitudinal axis (501) of the available parking space. As seen, the search lines (502A) are not aligned with the longitudinal axis (501). In an embodiment, the search lines (502A) are rotated by at least 2 degrees for each rotation until the search lines (502A) are aligned with the longitudinal axis (501) of the AV (103).

Figure 5B:
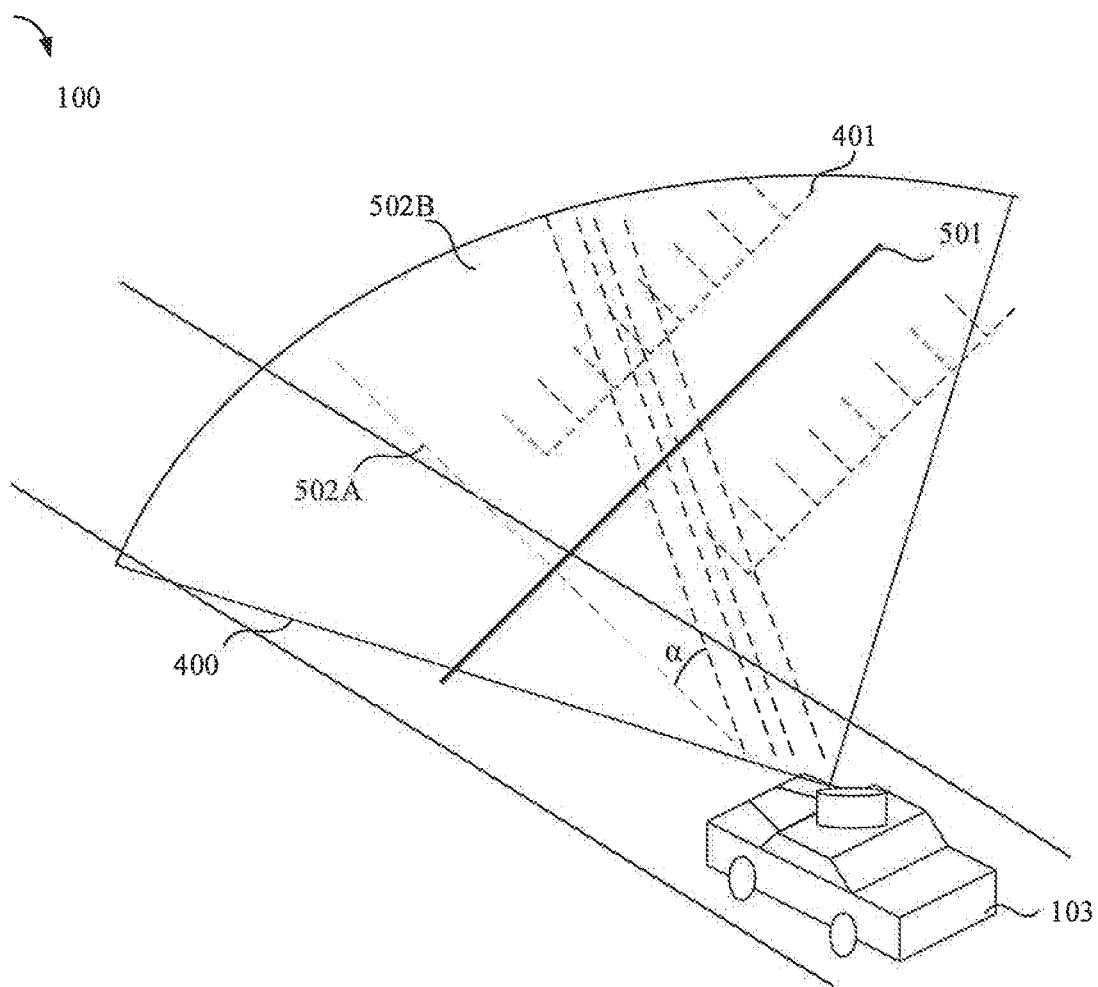
Figure 5C:
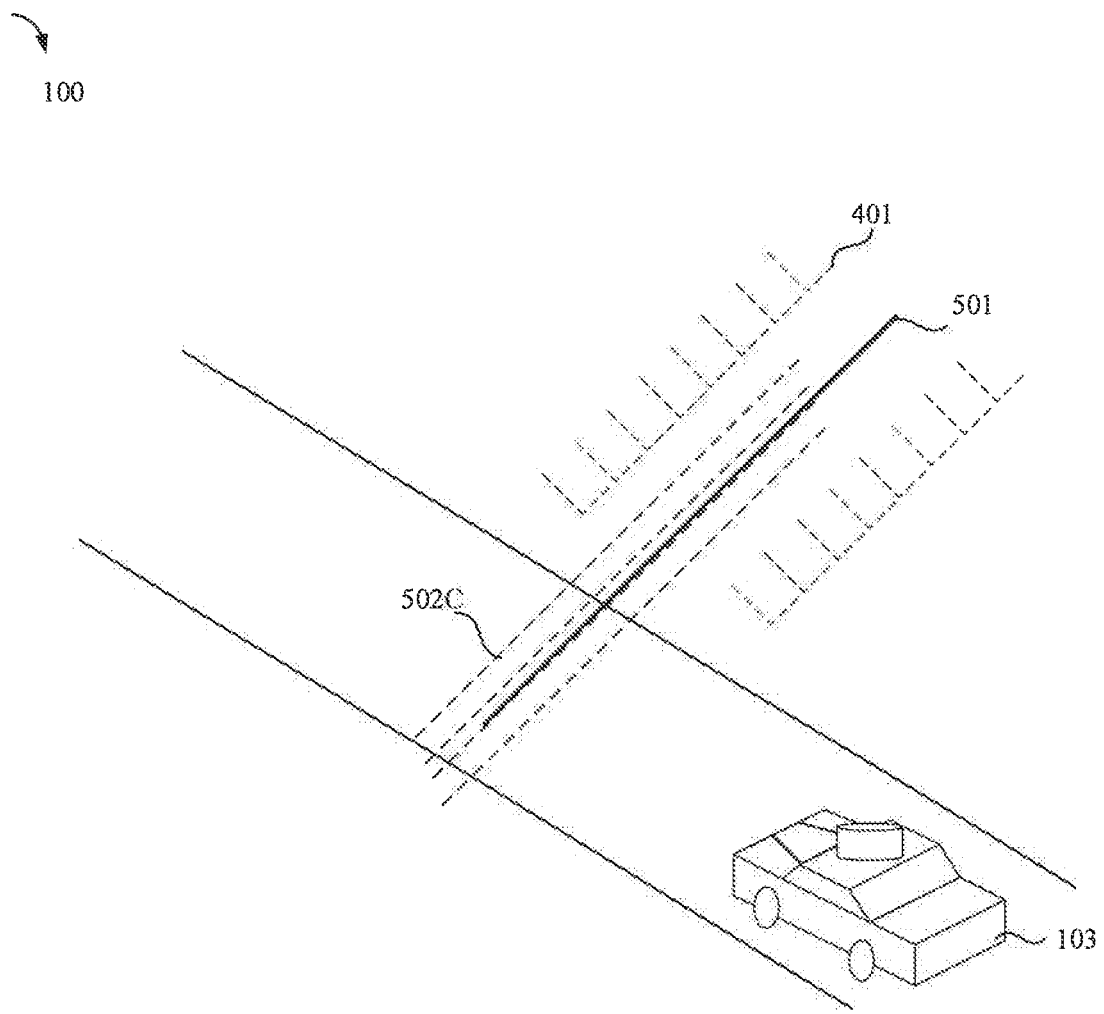

In an embodiment, FIG. 5B shows the search lines (502B) rotated from the initial search direction (502A) as shown in FIG. 5A. FIG. 5C shows the search lines (502C) aligned with the longitudinal axis (501) after further rotation. The search lines may be represented by ref numeral (502) in general. Let "a" be the angle between the initial search lines (502A) and rotated search lines (502B).

In an embodiment, let x1 and y1 represent location of the AV (103). Then, an equation of one search line (502) can be denoted as:

$$(x-x1)=s*(y-y1) \quad (1)$$

Where $$s=\tan^{-1}(\alpha);$$

In an embodiment, a plurality of search lines (502) may be generated having same alignment and spaced at least 20 cm apart. The equation of the plurality of search lines (502) may be denoted as:

$$(x-x1)=s*(y-y1)+n*20 \qquad (2)$$

Where n=0,1,2, ... N $$(x-x1)=(s+n*d)*(y-y1)+n*20 \qquad (3)$$

Where d=degrees of rotation of the search lines (502)

Figure 6A:
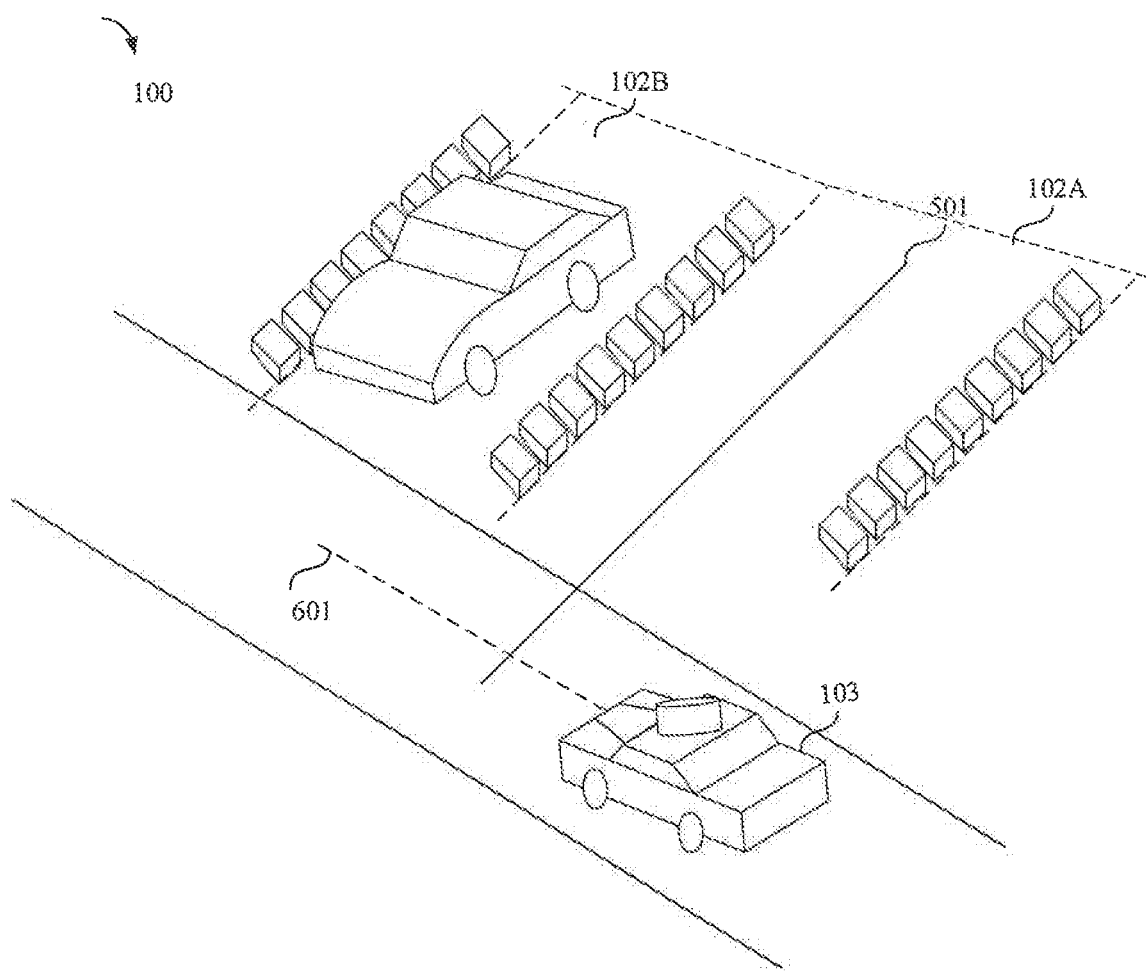
FIG. 6A-6C illustrate autonomously parking the AV in the available parking space, in accordance with an embodiment of the present disclosure.

In an embodiment, the park assist module (215) may be configured to assist the AV (103) in autonomous parking in the available parking space. As seen in FIG. 6A, a longitudinal axis (601) of the AV (103) is not aligned with the longitudinal axis of the parking space (502). In an embodiment, the park assist module (215) may be configured to obtain the line equation for the elevated parking boundary indicators (101) of the available parking space (102). In an embodiment, the longitudinal axis (601) is compared with the longitudinal axis (501) of the available parking space (102). In an embodiment, the AV (103) may be parked in the available parking space (102) in a reverse direction. In another embodiment, the AV (103) may be parked in a forward direction. Further explanation is provided with respect to parking the AV (103) in the reverse direction. Based on an angle difference, the AV (103) is rotated to align with the longitudinal axis (501).

In an embodiment, the park assist module (215) may decide which line will be at right side of the AV (103) after parking. If AV (103) scans on a right-hand side for parking, then furthest elevated parking boundary indicator (101A) may be on right side of the AV (103) after parking. The AV (103) may increase the alignment shift with the longitudinal axis (601) to achieve 170-degree alignment difference with the right-side elevated parking boundary indicator (for example 101A). This alignment is increased by continuously moving the vehicle forward and reverse with steering angle opposite to parking space. Also, the longitudinal axis (501) may pass through center of the AV (103).

Figure 6B:
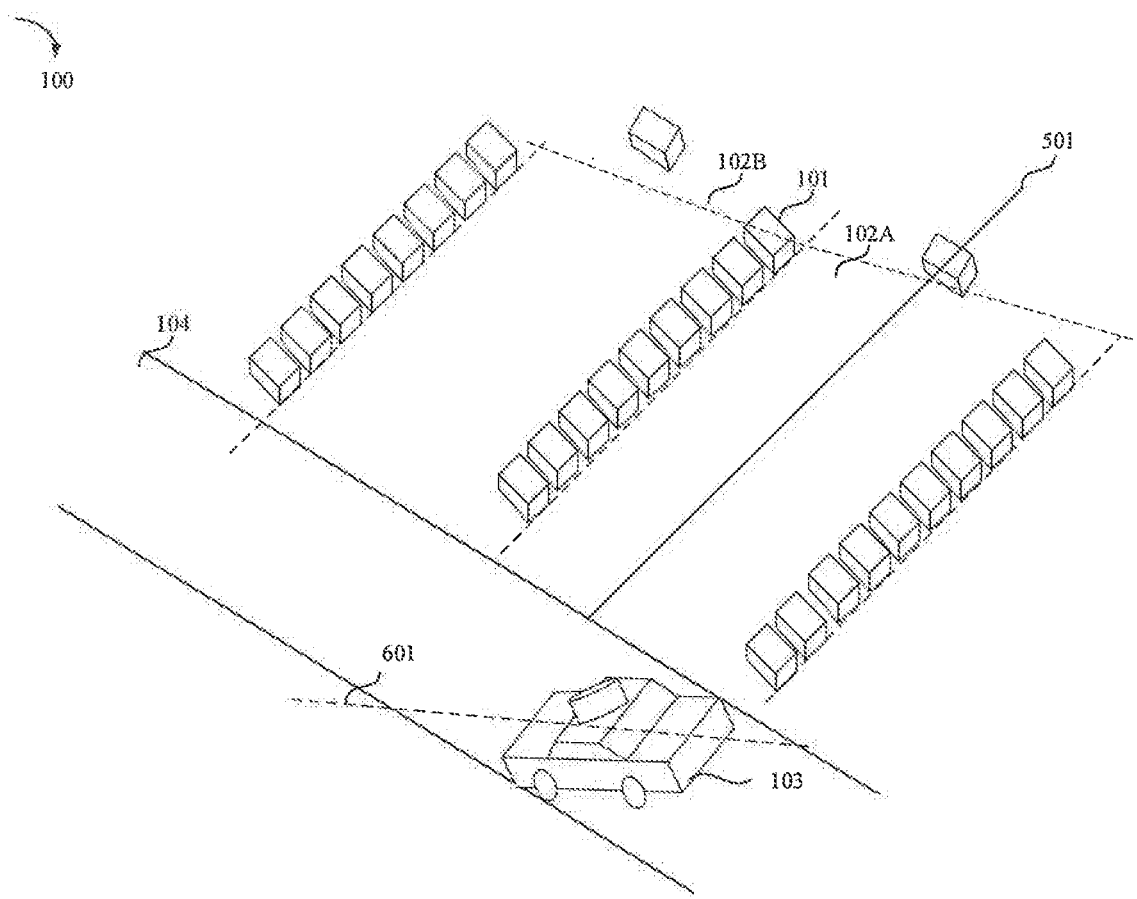
Figure 6C:
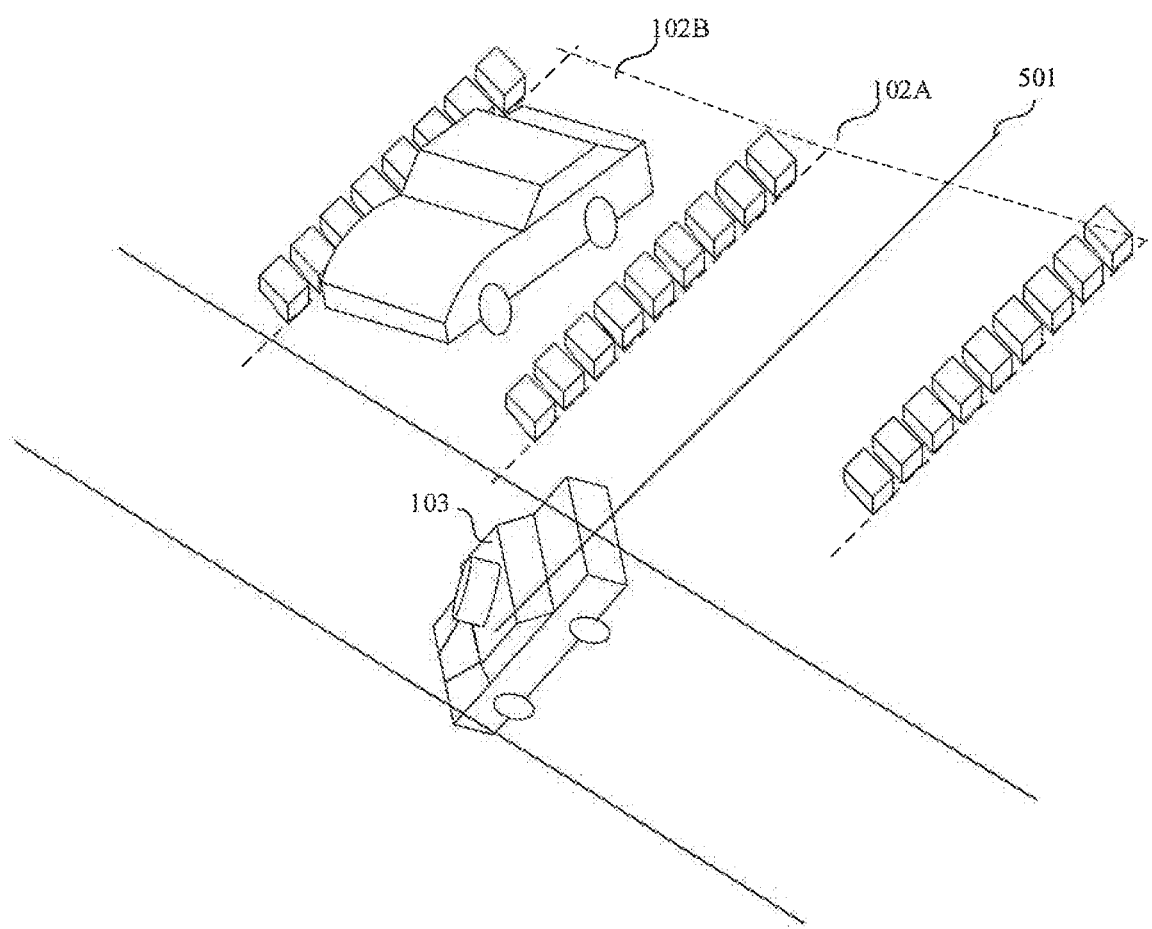

As seen in FIG. 6B, the AV (103) is steered back in an angle to increase the alignment shift with the longitudinal axis (601) to achieve 180-degree alignment difference with the longitudinal axis (501). Further, in FIG. 6C, the AV (103) is aligned with the longitudinal axis (501). Further, the park assist module (215) may steer the AV (103) in a reverse direction to park the AV (103) in the available parking space (102).

In an embodiment, the stop detection module may be configured to stop the AV (103) upon detection of a "STOP" sign marked block using ultrasound sensor in the available parking space (102). In another embodiment, a camera may also be used to detect the "STOP" sign.

In an embodiment, the present disclosure discloses a method and a system for autonomously parking AV (103) successfully at low light conditions. As LIDAR data points (205) are used, light conditions may not affect identifying the available parking space.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Parking premises |
| 101 | Elevated parking boundary indicator |
| 102 | Parking space |
| 103 | Autonomous vehicle |
| 104 | Road |
| 201 | I/O interface |
| 202 | Memory |
| 203 | Processor |
| 204 | Data |
| 205 | LIDAR data points |
| 206 | Parking premises map data |
| 207 | Environment data |
| 208 | Vehicle dimensions data |
| 209 | Elevated boundary data |
| 210 | Other data |
| 211 | Modules |
| 212 | Navigation module |
| 213 | Map surf module |
| 214 | Identification module |
| 215 | Park assist module |
| 216 | Other modules |

-continued

| REFERRAL NUMERALS: | |
|---|---|
| Reference number | Description |
| 501 | Longitudinal axis of parking space |
| 502 | Search lines |
| 601 | Longitudinal axis of AV |

What is claimed is:

1. A method for autonomously parking vehicles, the method comprising:
receiving, by an Electronic Control Unit (ECU) of a vehicle, an input signal for parking the vehicle in parking premises comprising a plurality of parking spaces, each parking space being associated with an elevated parking boundary indicator;
obtaining, by the ECU, a map of the parking premises for navigating the vehicle along the parking premises;
receiving, by the ECU, a plurality of Light Detection and Ranging (LIDAR) data points of the parking premises while navigating the vehicle along the parking premises;
identifying, by the ECU, a plurality of linear patterns from the plurality of LIDAR data points of the parking premises;
detecting, by the ECU, at least two linear patterns from the plurality of linear patterns and orientation of the at least two linear patterns, the at least two linear patterns having a predefined length and parallelly spaced apart, wherein the at least two linear patterns correspond to LIDAR data points indicating the elevated parking boundary indicator of an available parking space, the orientation of the at least two linear patterns detected by:
searching the plurality of LIDAR data points in search directions up to a height of 10 cm above a ground plane using search lines;
rotating the search directions by a predefined value until the search lines align with the LIDAR data points having a straight-line arrangement for determining the orientation of the at least two linear patterns, wherein the search directions are rotated by at least 2 degrees; and
detecting, by the ECU, orientation of the available parking space by generating the search lines, and comparing the search lines with a longitudinal axis of the available parking space, wherein the search lines are rotated incrementally by at least 2 degrees until the search lines are aligned with a longitudinal axis of the vehicle,
wherein the vehicle is autonomously parked in the available parking space, wherein parking the vehicle in the available parking space comprises:
determining the longitudinal axis of the available parking space; and
aligning the longitudinal axis of the vehicle with the longitudinal axis of the available parking space by incrementally rotating the vehicle in a predefined angle, wherein the vehicle is rotated incrementally by at least 5 degrees based on an angular difference in the longitudinal axis of the vehicle and the longitudinal axis of the available parking space.

2. The method of claim 1, wherein the plurality of linear patterns corresponds to LIDAR data points having a straight-line arrangement.

3. The method of claim 1, wherein parking the vehicle in the available parking space further comprises steering the vehicle along the longitudinal axis of the vehicle for parking the vehicle in the available parking space, wherein the vehicle is steered in one of a forward direction and a reverse direction.

4. An autonomous vehicle configured for autonomous parking, comprising:
an Electronic Control Unit (ECU) configured to:
receive an input signal for parking the vehicle in parking premises comprising a plurality of parking spaces, each parking space being associated with an elevated parking boundary indicator;
obtain a map of the parking premises for navigating the vehicle along the parking premises;
receive a plurality of Light Detection and Ranging (LIDAR) data points of the parking premises while navigating the vehicle along the parking premises;
identify a plurality of linear patterns from the plurality of LIDAR data points of the parking premises;
detect at least two linear patterns from the plurality of linear patterns and orientation of the at least two linear patterns, the at least two linear patterns having a predefined length and parallelly spaced apart by a predefined distance, wherein the at least two linear patterns correspond to LIDAR data points indicating the elevated parking boundary indicator of an available parking space, the orientation of the at least two linear patterns detected by:
searching the plurality of LIDAR data points in search directions up to a height of 10 cm above a ground plane using search lines;
rotating the search directions by a predefined value until the search lines align with the LIDAR data points having a straight-line arrangement for determining the orientation of the at least two linear patterns, wherein the search directions are rotated by at least 2 degrees; and
detecting, by the ECU, orientation of the available parking space by generating the search lines, and comparing the search lines with a longitudinal axis of the available parking space, wherein the search lines are rotated incrementally by at least 2 degrees until the search lines are aligned with a longitudinal axis of the vehicle,
wherein the vehicle is autonomously parked in the available parking space, wherein parking the vehicle in the available parking space comprises:
determining the longitudinal axis of the available parking space; and
aligning the longitudinal axis of the vehicle with the longitudinal axis of the available parking space by incrementally rotating the vehicle in a predefined angle, wherein the vehicle is rotated incrementally by at least 5 degrees based on an angular difference in the longitudinal axis of the vehicle and the longitudinal axis of the available parking space.

5. The autonomous vehicle of claim 4, wherein the ECU is configured to obtain the map from one of, a server associated with the parking premises and a memory associated with the ECU.

6. The autonomous vehicle of claim 4, wherein the ECU is configured to receive the plurality of LIDAR data points from a LIDAR unit of the vehicle, wherein the ECU identifies the plurality of linear patterns corresponding to the LIDAR data points having a straight-line arrangement.

7. The autonomous vehicle of claim 4, wherein the ECU further configures the vehicle to autonomously park in the available parking space by steering the vehicle along the longitudinal axis of the vehicle for parking the vehicle in the available parking space, wherein the ECU is configured to steer the vehicle in one of a forward direction and a reverse direction.

\* \* \* \* \*